US007529875B2

(12) United States Patent
Karamatas et al.

(10) Patent No.: US 7,529,875 B2
(45) Date of Patent: May 5, 2009

(54) ASSIGNING INTERRUPTS FOR INPUT/OUTPUT (I/O) DEVICES AMONG NODES OF A NON-UNIFORM MEMORY ACCESS (NUMA) SYSTEM

(75) Inventors: Chris P. Karamatas, Kirkland, WA (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 10/644,133

(22) Filed: Aug. 20, 2003

(65) Prior Publication Data

US 2005/0060460 A1    Mar. 17, 2005

(51) Int. Cl.
    *G06F 13/24* (2006.01)
(52) U.S. Cl. .................. 710/260; 718/102; 710/268
(58) Field of Classification Search .............. 710/260, 710/268; 718/102
    See application file for complete search history.

(56) References Cited

U.S. PATENT DOCUMENTS

| | | | | |
|---|---|---|---|---|
| 4,080,649 | A | * | 3/1978 | Calle et al. ............... 710/48 |
| 4,381,542 | A |   | 4/1983 | Binder et al. |
| 4,796,176 | A | * | 1/1989 | D'Amico et al. ........... 710/43 |
| 4,959,781 | A | * | 9/1990 | Rubinstein et al. ......... 710/262 |
| 5,179,707 | A | * | 1/1993 | Piepho .................. 710/260 |
| 5,379,434 | A |   | 1/1995 | DiBrino |
| 5,560,019 | A | * | 9/1996 | Narad ................... 710/260 |
| 6,148,361 | A |   | 11/2000 | Carpenter et al. |
| 6,170,025 | B1 | * | 1/2001 | Drottar et al. ............ 710/48 |
| 6,209,086 | B1 | * | 3/2001 | Chi et al. ............... 712/244 |
| 6,347,349 | B1 | * | 2/2002 | Neal et al. .............. 710/62 |
| 6,438,672 | B1 | * | 8/2002 | Fischer et al. ........... 711/210 |
| 6,965,973 | B2 | * | 11/2005 | Rowlands et al. ......... 711/141 |
| 7,237,099 | B2 | * | 6/2007 | Agatsuma et al. ......... 712/244 |
| 2002/0029358 | A1 |   | 3/2002 | Pawlowski et al. |
| 2002/0166016 | A1 |   | 11/2002 | DiBrino |
| 2003/0200250 | A1 | * | 10/2003 | Kiick .................. 709/102 |
| 2005/0071531 | A1 | * | 3/2005 | Oshins ................. 710/260 |

OTHER PUBLICATIONS

Whatis.com. Definition of "NUMA." Apr. 11, 2003. http://whatis.techtarget.com/definition/0,,sid9_gci212678,00.html.*
Lameter, Christoph. Effective Synchronization on Linux/NUMA Systems. Gelato Conference. May 20, 2005.*
Falsafi et al. Reactive NUMA: A Design for Unifying S-COMA and CC-NUMA. ACM. 1997.*
Bolosky et al. Simple But Effective Techniques for NUMA Memory Management. ACM. 1989.*
ccNuma Support, http://216,239,57.100, Jul. 24, 2002.

* cited by examiner

*Primary Examiner*—Khanh Dang
*Assistant Examiner*—Matthew D Spittle
(74) *Attorney, Agent, or Firm*—Mark McBurney

(57) ABSTRACT

Assigning interrupts for I/O devices among the nodes of NUMA systems is disclosed. At least one of the following is performed. First, interrupts for the devices are assigned among the nodes based on at least one of: the nodes to which the devices are connected, the nodes at which interrupt service routines for the devices reside, and the processors of the nodes. Second, for each node, the interrupts for the devices that are performance critical and that have been assigned to the node are assigned to the processors of the node in a round-robin manner. Third, assignments of the interrupts among the nodes of the system are dynamically modified based on actual performance characteristics of the assignments. Fourth, for each node, assignments of the interrupts that are performance critical and that have been assigned to the node are dynamically modified based on actual performance characteristics of the assignments.

8 Claims, 6 Drawing Sheets

ASSIGNING INTERRUPTS FOR INPUT/OUTPUT (I/O) DEVICES AMONG NODES OF A NON-UNIFORM MEMORY ACCESS (NUMA) SYSTEM

BACKGROUND OF THE INVENTION

1. Technical Field

This invention relates generally to assigning interrupts for input/output (I/O) devices among nodes of a system, and more particularly to assigning such interrupts among the processing nodes of a non-uniform memory access (NUMA) computer system.

2. Background Art

Input/output (I/O) device interrupt assignment refers generally to identifying the target set of processors that will bear the responsibility for servicing interrupt(s) from a specific I/O device. The interrupt assignment for a device is usually determined during initialization of the device driver for the device. A device's processor interrupt assignment can be as narrow as one processor, or as broad as all the processors within a system. Some operating systems use a round-robin approach to distribute the interrupt handling burden across the nodes of a system, assigning a given interrupt to all the of the processors within a given node selected to handle that interrupt.

However, such approaches do not necessarily optimally distribute the I/O device interrupt burden across nodes and processors for cache-coherent (cc) non-uniform memory access (NUMA) systems. In a NUMA system, access time to and from processors and memory is non-uniform, varying by processor and memory region. Specifically, access time from processors to I/O devices and between I/O devices and memory may vary. Round-robin approaches for assigning interrupts do not leverage such topologies of NUMA systems. For instance, the interrupt service routine (ISR) for an I/O device may reside on a first NUMA node, whereas the I/O device may itself be connected to a second NUMA node. A round-robin approach may very well select yet a third node to handle the interrupts for the device, causing the interrupt to be routed roundabout from the second node (at the device) to the round-robin-assigned third node, and from there to the second node where the ISR resides.

Such an example represents the degenerate case in which all interrupt processing is cross-nodal. That is, the node at which the memory storing the ISR resides is remote with respect to the interrupt-servicing processor's node, and both of these nodes are remote to the node at which the I/O device is connected. Furthermore, round-robin approaches do not distinguish between types of I/O devices when assigning device interrupts. Therefore, performance-critical I/O devices are treated the same as other I/O devices. Consequently, all the interrupts for performance-critical devices may be assigned to the same node, which can result in decreased system performance.

For this reason, as well as other reasons, there is a need for the present invention.

DISCLOSURE OF INVENTION

The invention relates to assigning interrupts for input/output (I/O) devices among the nodes of a non-uniform memory access (NUMA) system. A method of the invention performs at least one of the following. Interrupts for the I/O devices may be assigned among the NUMA nodes based on at least one of: the nodes to which the devices are connected, the nodes at which interrupt service routines (ISR's) for the devices reside, and the processors of the nodes. Additionally, for each NUMA node, the interrupts for the devices that are performance critical and that have been assigned to the node may be assigned to the processors of the node in a round-robin manner. Assignments of the interrupts among the nodes of the NUMA system may be dynamically modified based on actual performance characteristics of the assignments. Finally, for each NUMA node, assignments of the interrupts that are performance critical and that have been assigned to the node may be dynamically modified based on actual performance characteristics of the assignments.

A NUMA system of the invention includes nodes, I/O devices, and interrupt-assignment software. Each device is connected to one of the nodes, and has an interrupt. The interrupt-assignment software assigns the interrupt for each I/O device to one of the nodes of the system in a performance-optimized manner. An article of manufacture of the invention includes a computer-readable medium and means in the medium. The means in the medium is for assigning interrupts for I/O devices among nodes based on at least the nodes to which the devices are connected, and the nodes at which ISR's for the devices reside. Other features and advantages of the invention will become apparent from the following detailed description of the presently preferred embodiment of the invention, taken in conjunction with the accompanying drawings.

BEST MODE FOR CARRYING OUT THE INVENTION

Overview

Figure 1:
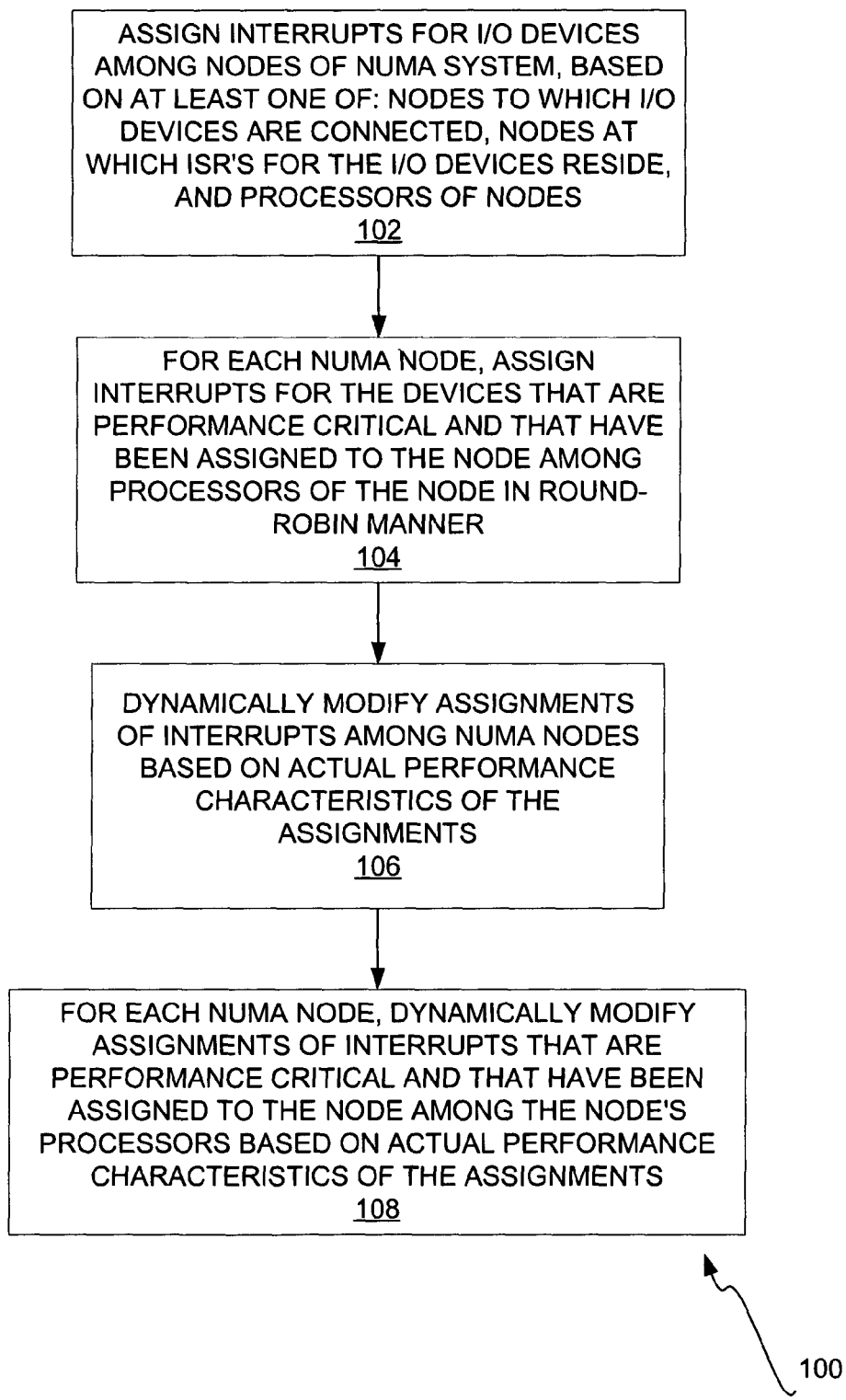
FIG. 1 is a diagram of a flowchart of a method for assigning interrupts for input/output (I/O) devices among nodes of a non-uniform memory access (NUMA) system, according to a preferred embodiment of the invention, and is suggested for accompanying the abstract.

FIG. 1 shows a method 100 for assigning interrupts for input/output (I/O) devices among the nodes of a non-uniform memory access (NUMA) system in a performance-optimized manner, according to a preferred embodiment of the invention. The method 100 may be performed by interrupt-assignment software residing at one of the NUMA nodes. The method 100 may also be implemented within an article of manufacture having a computer-readable medium. The medium may be a recordable data storage medium, a modulated carrier signal, or another type of medium. Each of the I/O devices is connected to a given one of the nodes of the NUMA system. Furthermore, each I/O device has an associated interrupt service routine (ISR) that resides at a given one of the NUMA nodes. The node to which a device is connected is not necessarily the node at which the ISR for the device resides.

First, the interrupts for the I/O devices are assigned among the nodes of the NUMA system based on at least one of: the nodes to which the devices are connected, the nodes at which ISR's for the devices reside, and processors of the nodes (102). That is, assignment of the device interrupts takes into account at least one of these three factors. Taking into account the processors of the nodes, for instance, can mean that the assignment takes into account whether or not the nodes have processors, memory for the processors, and/or a cache for the memory for the processors to use. A specific manner by which assignment of device interrupts among NUMA nodes can be implemented based on these factors is described in a subsequent section.

Second, for each node of the NUMA system, the interrupts for the I/O devices that are performance critical and that have been assigned to the node are assigned among the processors of the node in a round-robin manner (104). Performance-critical devices may be defined in any way as compared to non-performance-critical devices. A round-robin manner of assigning the interrupts for the devices that have been assigned to a node to the processors of the node can be performed as illustrated by the following example. If there are interrupts for five performance-critical devices assigned to the node, and the node has four processors, three processors would each be assigned the interrupt for one device, and one processor would be assigned the interrupts for two devices. Thus, the round-robin approach distributes interrupts for performance-critical devices as evenly as possible among the processors of a NUMA node, numerically speaking.

Third, once the interrupts for the I/O devices have been assigned among the NUMA nodes in 102 preferably at device driver initialization time, the assignments of the interrupts among the nodes can subsequently be dynamically modified at run-time based on actual performance characteristics of the assignments (106). For example, the interrupt for an I/O device may have initially been assigned to the node to which the device is connected. If the responsiveness of this node in handling the interrupt is worse than, for instance, the responsiveness of the node at which the ISR for the device resides in handling the interrupt, then the interrupt may be reassigned from the former node to the latter node. A specific manner by which dynamic modification of assignments of interrupts among the nodes of the NUMA system can be implemented is described in a subsequent section.

Fourth, for each node of the NUMA system that has been assigned interrupts for performance-critical devices, once these interrupts have been assigned among the processors of the node in 104 preferably at device driver initialization time, the assignments of the interrupts among these processors can be dynamically modified at run-time based on actual performance characteristics of the assignments (108). For example, one processor may have interrupts for three performance-critical devices assigned thereto, and another processor may have interrupts for two performance-critical devices assigned thereto. If the responsiveness of the former processor in handling its interrupts is worse than the responsiveness of the latter processor in handling its interrupts by more than a given threshold, then the interrupt for one performance-critical device may be reassigned from the former processor to the latter processor. A specific manner by which dynamic modification of assignments of interrupts for performance-critical devices among the processors of a given NUMA node can be implemented is described in a subsequent section.

Technical Background

Figure 2:
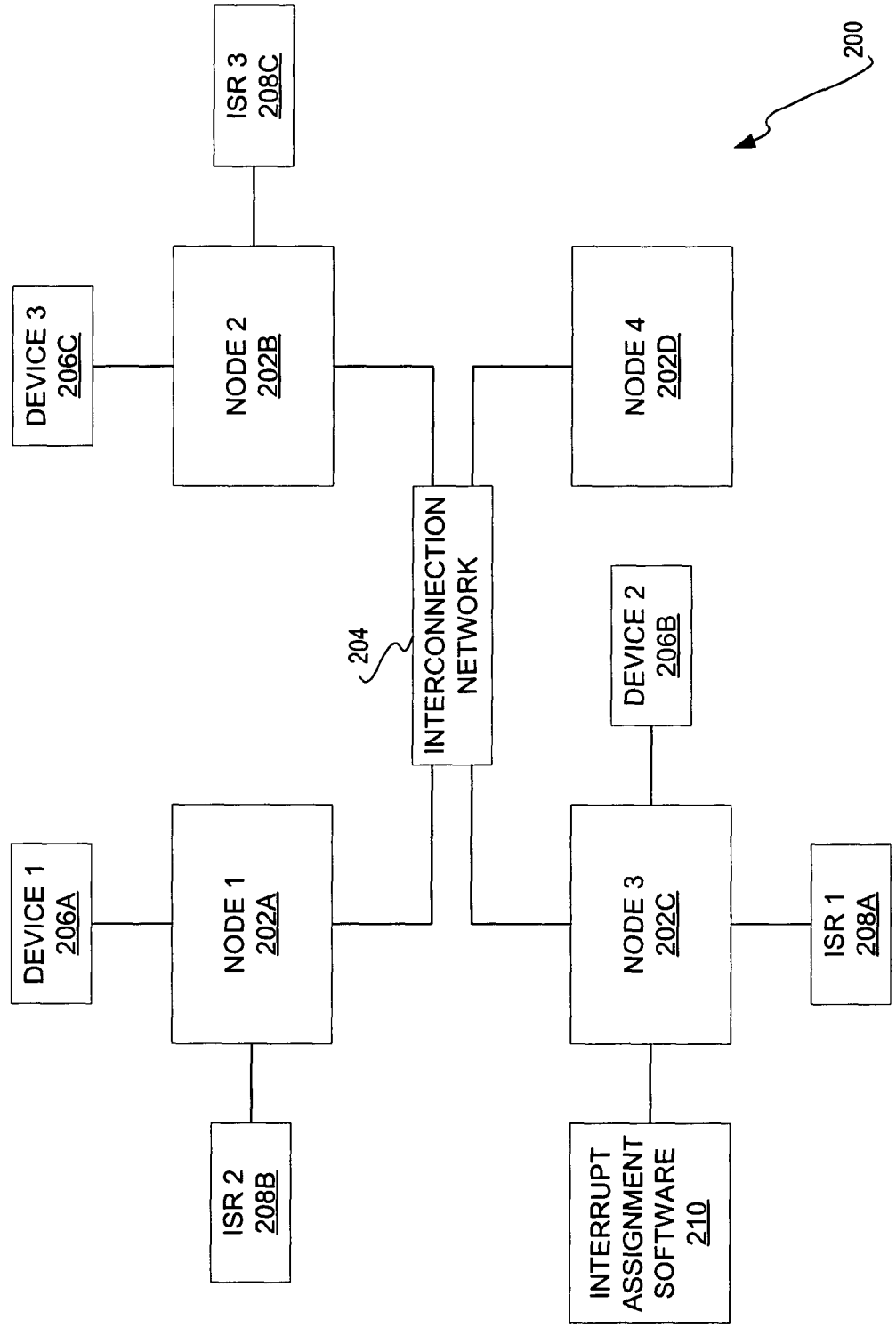
FIG. 2 is a diagram of a NUMA system in conjunction with which embodiments of the invention can be implemented.

FIG. 2 shows a non-uniform memory access (NUMA) system 200 in accordance with which embodiments of the invention may be implemented. The system 200 includes a number of nodes 202A, 202B, 202C, and 202D, which are collectively referred to as the nodes 202. The nodes 202 are connected with one another through an interconnection network 204. Each of the nodes 202 may include a number of processors and memory. However, other of the nodes 202 may not include either processors or memory. The memory of a given node is local to the processors of the node, and is remote to the processors of the other nodes. In this way, the system 200 implements a non-uniform memory architecture (NUMA).

The system 200 includes by way of example three input/output (I/O) devices 206A, 206B, and 206C, collectively referred to as the I/O devices 206, and which have interrupt service routines (ISR's) 208A, 208B, and 208C, respectively, which are collectively referred to as the ISR's 208. The device 206A is connected to the node 202A, whereas the ISR 208A for the device 206A resides at the node 202C. Similarly, the device 206B is connected to the node 202C, but the ISR 208B for the device 206B resides at the node 202A. The device 206C is connected to and the ISR 208C for the device 206C resides at the same node 208C. The node 202D does not have any of the devices 206 connected thereto, nor does any of the ISR's 208 for the devices 206 reside thereat. The distribution and number of the devices 206 and the ISR's 208 among the nodes 202 depicted in FIG. 2 is for exemplary purposes only.

The system 200 also includes interrupt-assignment software 210. The interrupt-assignment software 210 is specifically depicted as residing at the node 202C, although it may reside at any other of the nodes 202 as well. The interrupt-assignment software 210 assigns interrupts for the I/O devices 206 among the nodes 202 in a performance-optimized manner. For example, interrupt-assignment the software 210 may perform the method 100 that has been described. The interrupt-assignment software 210 may also perform the methods that are described in subsequent sections.

Figure 3:
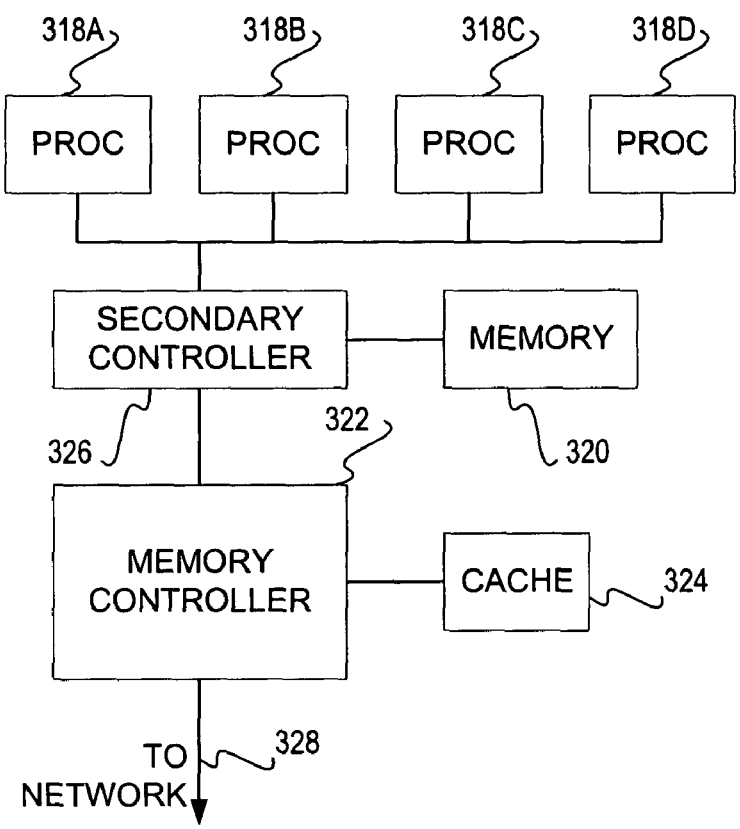
FIG. 3 is a diagram of a NUMA node in conjunction with which embodiments of the invention can be implemented.

FIG. 3 shows in more detail a node 300, in conjunction with which embodiments of the invention may be implemented, which can implement one or more of the nodes 202 of FIG. 2. As can be appreciated by those of ordinary skill within the art, only those components needed to implement one embodiment of the invention are shown in FIG. 3, and the node 300 may include other components in addition to and/or in lieu of the components of FIG. 3 as well. The node 300 has four processors 318A, 318B, 318C, and 318D, collectively referred to as the processors 318, and a memory bank 320. Not shown in FIG. 3 is that the node 300 may have one or more of I/O devices connected thereto, and/or one or more ISR's for the I/O devices residing thereat.

A memory controller 322 manages requests to and responses from the memory bank 320. The controller 322 may be an applications-specific integrated circuit (ASIC) in one embodiment, as well as another combination of software and hardware. To assist in management of the bank 320, the controller 322 has a cache 324. A secondary controller 326 specifically interfaces the memory 320, the processors 318, and the memory controller 322 with one another. The memory controller 322 is preferably directly connected to the interconnection network that connects all the nodes, such as the interconnection network 204 of FIG. 2. This is indicated by the line 328.

Assigning Interrupts for I/O Devices Among NUMA Nodes

Figure 4:
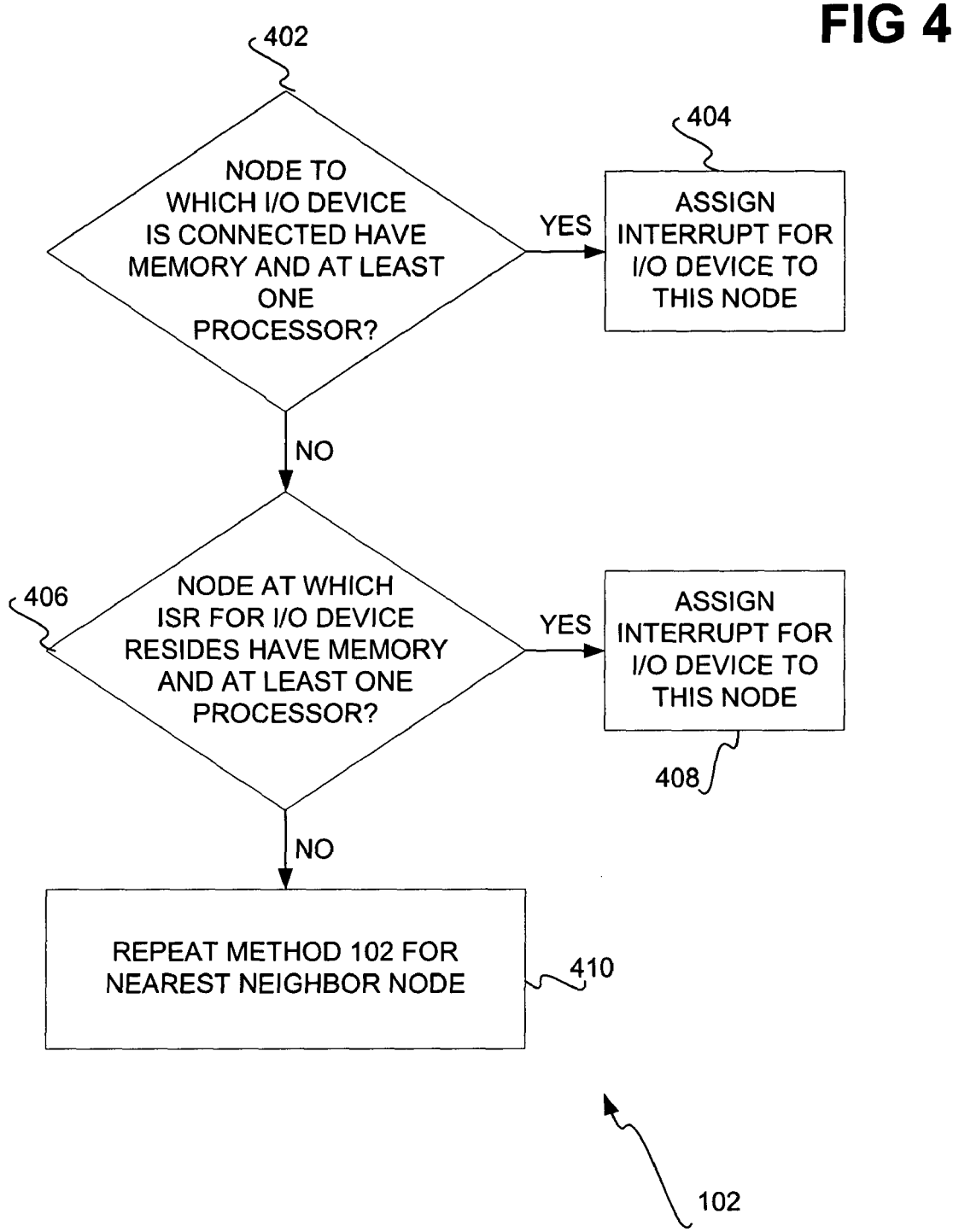
FIG. 4 is a flowchart of a method for initially assigning interrupts for I/O devices among NUMA nodes, according to an embodiment of the invention.

FIG. 4 shows a method 102 for assigning the interrupts for input/output (I/O) devices among the nodes of a non-uniform memory access (NUMA) system, according to an embodiment of the invention. The method 102 is performed for the interrupt of each I/O device. First, if the node to which the I/O device is connected has a memory and at least one processor (402), then the interrupt for the I/O device is assigned to this node (404). Otherwise, if the node at which the interrupt service routine (ISR) for the I/O device resides has memory and at least one processor (406), then the interrupt for the I/O device is assigned to this node (408). Otherwise, the method 102 is repeated, starting at 402, with a next closest neighbor node (410). For instance, this can be a node that is physically and/or logically adjacent to the node to which the I/O device is connected, or the node that is physically and/or logically adjacent to the node at which the ISR for the I/O device resides.

Dynamically Modifying Interrupt Assignments Among NUMA Nodes

Figure 5:
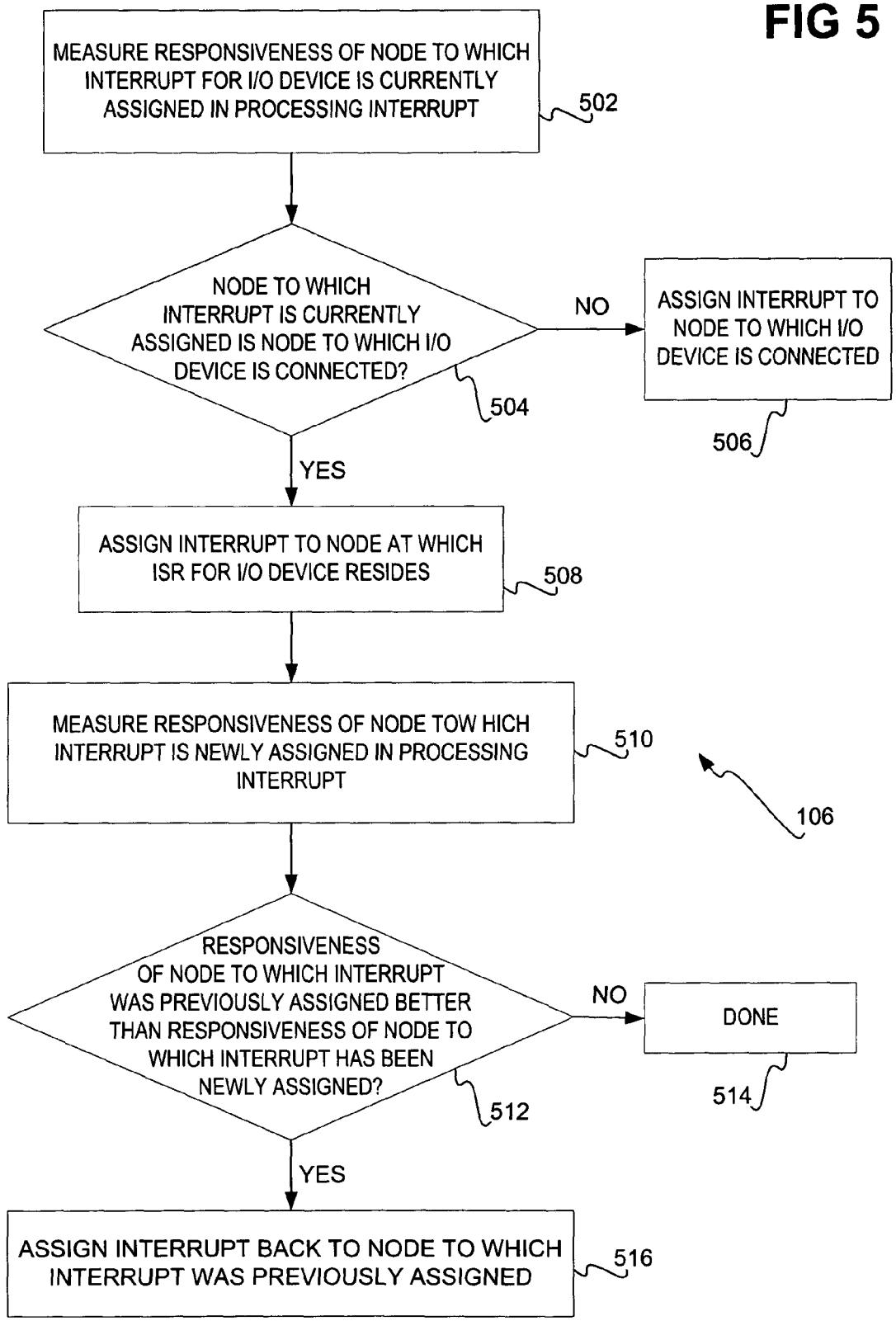
FIG. 5 is a flowchart of a method for dynamically modifying assignments of the interrupts among the NUMA nodes based on actual performance characteristics of the assignments, according to an embodiment of the invention.

FIG. 5 shows a method 106 for dynamically modifying the initial interrupt assignments among the nodes of a non-uniform memory access (NUMA) system, according to an embodiment of the invention. The method 106 is thus performed after the method 102 of FIG. 4 has been performed, or after 102 of the method 100 of FIG. 1 has been performed. The method 106 is performed for the interrupt of each input/output (I/O) device that has either been assigned to the node to which the device is connected, or the node at which the interrupt service routine (ISR) for the device resides, and where both the node to which the device is connected and the node at which the ISR for the device can receive assignment of the interrupt, even if they do not currently have the interrupt for the device assigned thereto. The method 106 may be performed after device driver initialization, such as during run-time. As can be appreciated by those of ordinary skill within the art, dynamic modification of the initial interrupt assignments among NUMA nodes can be accomplished in ways other than that depicted in FIG. 5.

First, the responsiveness of the node to which the interrupt for an I/O device is currently assigned in processing the interrupt is measured (502). This may be measured in units of time, for instance. If the node to which the interrupt is currently assigned is not the node to which the I/O device is connected (504), then the interrupt is assigned to the node to which the I/O device is connected (506). Otherwise, the interrupt is assigned to the node at which the ISR for the I/O device resides (508). The effect of 504, 506, and 508 is to switch the interrupt assignment from the node to which the device is connected to the node at which the ISR for the device resides, or vice-versa. The responsiveness of the newly assigned node in processing the interrupt is then measured (510). This may also be measured in units of time, for instance.

If the responsiveness of the node to which the interrupt was previously assigned is not better than the responsiveness of the node to which the interrupt has been newly assigned (512), then the method 104 is finished (514). That is, the interrupt for the I/O device remains assigned to the node to which it was assigned in 506 or 510. Otherwise, the interrupt is reassigned back to the node to which it was previously assigned (516). That is, the interrupt for the I/O device is reassigned to the node that it had been assigned to when 502 was performed. The effect of 512, 514, and 516 is to have the interrupt for an I/O device assigned to either the node to which the device is connected or the node at which the ISR for the device resides that is more responsive in handling, or processing, the interrupt.

Dynamically Modifying Interrupt Assignments Among NUMA Node Processors

Figure 6:
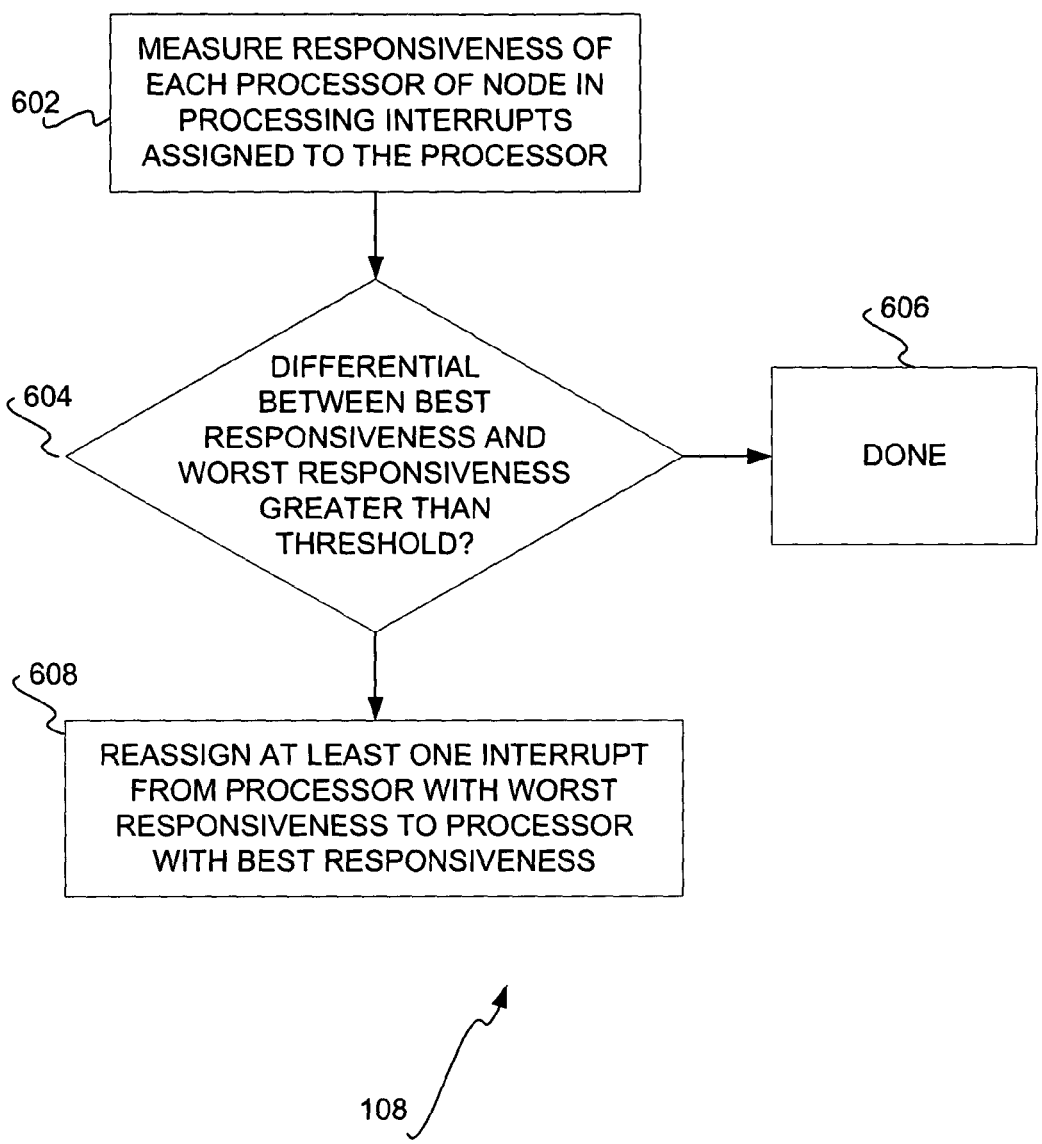
FIG. 6 is a flowchart of a method for dynamically modifying assignments of the interrupts assigned to a given node that are performance critical among the node's processors based on actual performance characteristics of the assignments, according to an embodiment of the invention.

FIG. 6 shows a method 108 for dynamically modifying the initial interrupt assignments among the processors of a given node of a non-uniform memory access (NUMA) system specifically for performance-critical input/output (I/O) devices, according to an embodiment of the invention. The method 108 is thus performed after 104 of the method 100 of FIG. 1 has been performed. The method 108 is performed for each NUMA node that has had interrupts for one or more performance-critical I/O devices assigned thereto, and that has more than one processor over which the interrupts have been specifically assigned. The method 108 may be performed after device driver initialization, such as during run-time. As can be appreciated by those of ordinary skill within the art, dynamic modification of the initial interrupt assignments for performance-critical devices among the processors of a given NUMA node can be accomplished in ways other than that depicted in FIG. 6.

First, the responsiveness of each processor within the given NUMA node in processing interrupts for performance-critical I/O devices assigned to the processor is measured (602). That is, each processor of the node that has been assigned interrupts for performance-critical I/O devices has its responsiveness measured in processing the interrupts. Responsiveness may be measured in units of time. Where the processors of the node that have interrupts for performance-critical devices assigned thereto do not have equal numbers of such assigned interrupts, then the responsiveness of each processor for each of such interrupts may be averaged to obtain a responsiveness that can be properly compared to the responsiveness of each other processor. However, if such processors have equal numbers of interrupts for performance-critical devices assigned thereto, then the responsiveness of each processor for its assigned interrupts may simply be the addition of the responsiveness of the processor in handling each of its assigned interrupts.

For example, one processor may have been assigned interrupts for two performance-critical devices, where the responsiveness in processing the first interrupt may be A and the responsiveness in processing the second interrupt may be B. Another processor may have been assigned the interrupt for one performance-critical device, where the responsiveness in processing the second interrupt may be C. To compare the responsiveness of the former processor with the latter processor, the time $(A+B)/2$ may be compared with the time C. However, if the latter processor also has been assigned the interrupt for another performance-critical device, and the responsiveness in processing this additional interrupt is D, then the time $A+B$ may be compared to the time $C+D$ in comparing the responsiveness of the former processor with the latter processor.

If the differential between the best responsiveness and the worst responsiveness among the processors in processing interrupts for their assigned performance-critical devices is not greater than a given threshold (604), then the method 108 is finished (606), and no modification of the interrupt assignments among the processors occurs. However, if this difference is greater than the threshold (604), then the interrupts for at least one performance-critical device may be reassigned from the processor having the worst responsiveness to the processor having the best responsiveness (608). For instance, in the example of the previous paragraph, if the time $(A+B)/2$ is greater than the time C by more than a threshold, signifying that the responsiveness of the first processor is worse than the responsiveness of the second processor by more than the threshold, then the interrupt for one of the devices assigned to the former processor may be reassigned to the latter processor.

Advantages over the Prior Art

Embodiments of the invention provide for advantages over the prior art. The approach to assigning the interrupts for input/output (I/O) devices among the nodes of a non-uniform memory access (NUMA) system that has been described thus substantially guarantees an interrupt assignment that is either proximate to the I/O device or to the device's interrupt service routine (ISR). Such an implementation reduces the contention of the NUMA systems' interconnect, and yields improved system performance.

Conclusion

It will be appreciated that, although specific embodiments of the invention have been described herein for purposes of illustration, various modifications may be made without departing from the spirit and scope of the invention. For instance, whereas the invention has been substantially described in relation to non-uniform memory access (NUMA) systems at least some embodiments of the invention may be applicable to non-NUMA systems. Accordingly, the scope of protection of this invention is limited only by the following claims and their equivalents.

We claim:

1. A method comprising:
    assigning interrupts for a plurality of input/output (I/O) devices among a plurality of nodes of a system based on at least one of the nodes to which the I/O devices are connected; the nodes at which interrupt service routines for the I/O devices reside; and, processors of the nodes for the nodes having processors, where one or more of the nodes are processorless and/or memoryless and one or more other of the nodes have processors and memory,
    wherein assigning the interrupts for the I/O devices among the nodes of the system comprises, for a given interrupt for a given I/O device, the given I/O device connected to a first node of the nodes of the system, the given I/O device having an interrupt service routine to handle the given interrupt, the interrupt service routine residing at a second node of the nodes of the system, the first node being different than the second node, in order from (a)-(c):
        (a) where the first node to which the given I/O device is connected has a cache, memory, and at least one processor, and the second node at which the interrupt service routine of the given I/O device resides does have a cache, memory, and at least one processor, assigning the given interrupt for the given I/O device to the first node;
        (b) where the first node does not have a cache, memory, and at least one processor, the second node at which the interrupt service routine of the given I/O device resides does have a cache, memory, and at least one processor, and a third node of the nodes of the nodes of the system has memory and at least one processor, assigning the given interrupt for the given I/O device to the second node;
        (c) where both the first node and the second node do not each have a cache, memory, and at least one processor, assigning the given interrupt for the given I/O device to the third node, the third node being different than the first node and the second node;
    for each node having processors, assigning the interrupts for the devices that are performance critical and that have been assigned to the node among the processors of the node in a round-robin manner;
    dynamically modifying assignments of the interrupts among the nodes of the system based on actual performance characteristics of the assignments; and,
    for each node having processors, dynamically modifying assignments of the interrupts that are performance critical and that have been assigned to the node among the processors of the node based on actual performance characteristics of the assignments.

2. The method of claim 1, wherein dynamically modifying the assignments of the interrupts among the nodes of the system comprises, for each assignment of an interrupt for an I/O device to a node, where the node is that to which the I/O device is connected:
    measuring responsiveness of the node in processing the interrupt;
    assigning the interrupt to the node at which the interrupt service routine for the I/O device resides;
    measuring responsiveness of the node at which the interrupt service routine for the I/O device resides in processing the interrupt; and,
    where the responsiveness of the node to which the I/O device is connected is better than the responsiveness of the node at which the interrupt service routine for the I/O device resides, reassigning the interrupt to the node to which the I/O device is connected.

3. The method of claim 2, wherein dynamically modifying the assignments of the interrupts among the nodes of the system comprises, for each assignment of an interrupt for an I/O device to a node, where the node is that at which the interrupt service routine for the I/O device resides:
    measuring responsiveness of the node in processing the interrupt;
    assigning the interrupt to the node to which the I/O device is connected;
    measuring responsiveness of the node to which the I/O device is connected in processing the interrupt; and,
    where the responsiveness of the node at which the interrupt service routine for the I/O device resides is better than the responsiveness of the node to which the I/O device is connected, reassigning the interrupt to the node at which the interrupt service routine for the I/O device resides.

4. The method of claim 1, wherein, for each node of the system having processors, dynamically modifying the assignments of the interrupts that are performance critical and that have been assigned to the node among the processors of the node comprises:
    measuring responsiveness of the processors of the node in processing the interrupts assigned thereto;
    where a differential between a best responsiveness and a worst responsiveness is greater than a threshold,
        reassigning at least one of the interrupts assigned to the processor having the worst responsiveness to the processor having the best responsiveness.

5. A method comprising:
    assigning interrupts for a plurality of input/output (I/O) devices among a plurality of nodes based on at least one factor selected from the set consisting of the nodes to which the I/O devices are connected; and the nodes at which interrupt service routines for the I/O devices reside, where one or more of the nodes are processorless and/or memoryless and one or more other of the nodes have processors and memory, wherein assigning the interrupts for the I/O devices among the nodes of the system comprises, for a given interrupt for a given I/O device, the given I/O device connected to a first node of the nodes of the system, the given I/O device having an interrupt service routine to handle the given interrupt, the interrupt service routine residing at a second node of the nodes of the system, the first node being different than the second node, in order from (a)-(c):
  (a) where the first node to which the given I/O device is connected has a cache, memory, and at least one processor, and the second node at which the interrupt service routine of the given I/O device resides does have a cache, memory, and at least one processor, assigning the given interrupt for the given I/O device to the first node;
  (b) where the first node does not have a cache, memory, and at least one processor, the second node at which the interrupt service routine of the given I/O device resides does have a cache, memory, and at least one processor, and a third node of the nodes of the nodes of the system has memory and at least one processor, assigning the given interrupt for the given I/O device to the second node;
  (c) where both the first node and the second node do not each have a cache, memory, and at least one processor, assigning the given interrupt for the given I/O device to the third node, the third node being different than the first node and the second node;
for each node of the system having processors, assigning the interrupts for the devices that are performance critical and that have been assigned to the node among the processors of the node in a round-robin manner;
dynamically modifying assignments of the interrupts among the nodes of the system based on actual performance characteristics of the assignments; and,
for each node of the system having processors, dynamically modifying assignments of the interrupts that are performance critical and that have been assigned to the node among the processors of the node based on actual performance characteristics of the assignments.

6. The method of claim 5, wherein dynamically modifying the assignments of the interrupts among the nodes of the system comprises, for each assignment of an interrupt for an I/O device to a node, where the node is that to which the I/O device is connected:
  measuring responsiveness of the node in processing the interrupt;
  assigning the interrupt to the node at which the interrupt service routine for the I/O device resides;
  measuring responsiveness of the node at which the interrupt service routine for the I/O device resides in processing the interrupt; and,
  where the responsiveness of the node to which the I/O device is connected is better than the responsiveness of the node at which the interrupt service routine for the I/O device resides, reassigning the interrupt to the node to which the I/O device is connected.

7. The method of claim 5, wherein, for each node of the system having memory, dynamically modifying the assignments of the interrupts that are performance critical and that have been assigned to the node among the processors of the node comprises:
  measuring responsiveness of the processors of the node in processing the interrupts assigned thereto;
  where a differential between a best responsiveness and a worst responsiveness is greater than a threshold,
    reassigning at least one of the interrupts assigned to the processor having the worst responsiveness to the processor having the best responsiveness.

8. The method of claim 6, wherein dynamically modifying the assignments of the interrupts among the nodes of the system comprises, for each assignment of an interrupt for an I/O device to a node, where the node is that at which the interrupt service routine for the I/O device resides:
  measuring responsiveness of the node in processing the interrupt;
  assigning the interrupt to the node to which the I/O device is connected;
  measuring responsiveness of the node to which the I/O device is connected in processing the interrupt; and,
  where the responsiveness of the node at which the interrupt service routine for the I/O device resides is better than the responsiveness of the node to which the I/O device is connected, reassigning the interrupt to the node at which the interrupt service routine for the I/O device resides.

* * * * *